United States Patent
Zhang et al.

(10) Patent No.: US 11,201,542 B2
(45) Date of Patent: Dec. 14, 2021

(54) METHOD FOR DETERMINING STABILITY RANGE OF CONTROL PARAMETERS OF BUCK-BOOST CONVERTER BASED ON SEGMENTED DELAY FEEDBACK CONTROL

(71) Applicant: HUNAN UNIVERSITY OF SCIENCE AND TECHNOLOGY, Hunan (CN)

(72) Inventors: Xiaoping Zhang, Hunan (CN); Ruirui Zhang, Hunan (CN); Zhi Wu, Hunan (CN)

(73) Assignee: HUNAN UNTVERSITY OF SCIENCE AND TECHNOLOGY, Xiangtan (CN)

( * ) Notice: Subject to any disclaimer, the term of this patent is extended or adjusted under 35 U.S.C. 154(b) by 0 days.

(21) Appl. No.: 17/096,766

(22) Filed: Nov. 12, 2020

(65) Prior Publication Data

US 2021/0067036 A1    Mar. 4, 2021

Related U.S. Application Data

(63) Continuation of application No. PCT/CN2019/098332, filed on Jul. 30, 2019.

(30) Foreign Application Priority Data

Apr. 25, 2019 (CN) .......................... 201910339504.9

(51) Int. Cl.
*H02M 3/156* (2006.01)
(52) U.S. Cl.
CPC .................................. *H02M 3/156* (2013.01)

(58) Field of Classification Search
None
See application file for complete search history.

(56) References Cited

FOREIGN PATENT DOCUMENTS

| CN | 106655799 A | 5/2017 |
|----|-------------|--------|
| CN | 106787697 A | 5/2017 |

OTHER PUBLICATIONS

Zhang Xiaoping, Li Xiaoqiu, Wu Zhi; Study on Stability of BBMC Under Voltage and Current Control Mode; May 31, 2018; National-Local Joint Engineering Laboratory of Marine Mineral Resources Exploration Equipment and Safety Technology, Hunan University of Science and Technology.

(Continued)

*Primary Examiner* — Jeffrey A Gblende
(74) *Attorney, Agent, or Firm* — Wayne IP LLC

(57) ABSTRACT

Disclosed a method for determining a stability range of control parameters of a Buck-Boost converter based on segmented delay feedback control, including by taking inductor current and capacitor current in a Buck-Boost converter as state variables, establishing state differential equations respectively for two different level states of the converter under the pulse input voltage; based on different input voltages, correcting inductor reference current to obtain novel inductor reference current; based on the state differential equations and the novel inductor reference current, obtaining a discrete iteration mapping model of a system; based on the discrete iteration mapping model, obtaining function equations corresponding to an upper limit and a lower limit of control parameters of the converter when the segmented delay feedback control is used to realize the stable operation of the system under the pulse input voltage, and determining a stability range of the corresponding control parameters by the function equations.

6 Claims, 3 Drawing Sheets

(56) References Cited

OTHER PUBLICATIONS

Li Xiaoqiu, Zhang Xiaoping; Study on Nonlinear Characteristics of Buck-Boost Converter in Pulse Input Voltage; May 31, 2017; National-Local Joint Engineering Laboratory of Marine Mineral Resources Exploration Equipment and Safety Technology, Hunan University of Science and Technology.

METHOD FOR DETERMINING STABILITY RANGE OF CONTROL PARAMETERS OF BUCK-BOOST CONVERTER BASED ON SEGMENTED DELAY FEEDBACK CONTROL

CROSS-REFERENCE TO RELATED APPLICATIONS

This application is a continuation of International Patent Application No. PCT/CN2019/098332, filed on Jul. 30, 2019, which claims the benefit of priority from Chinese Patent Application No. 201910339504.9, filed on Apr. 25, 2019. The content of the aforementioned applications, including any intervening amendments thereto, is incorporated herein by reference.

TECHNICAL FIELD

The present invention belongs to the technical field of power electronics, and particularly relates to a method for determining a stability range of control parameters of a Buck-Boost converter based on segmented delay feedback control.

BACKGROUND OF THE PRESENT INVENTION

Buck-Boost converters are widely used because of their advantages such as simple structure, wide adjusting range of output voltage and capability of realizing buck-boost control. However, because the converter is a system with variable structure and strong non-linearity, it may produce bifurcation and chaos phenomenon under certain conditions and lead to the problems such as excessive loud irregular electromagnetic noise and increased oscillation during the operation of the converter, which directly affects the stable operation of the converter. Therefore, the research on an effective chaos control method for the converter has important significance for ensuring the stable operation of the system.

There are a series of researches on the chaos control of the Buck-Boost converter both in China and abroad, and various control methods such as OGY control method, nonlinear segment quadratic function feedback control method and parameter resonance perturbation method have been proposed, which have already obtained good control effect. However, the above methods are proposed for the chaos phenomenon of the converter when the steady-state DC voltage is inputted. When the converter directly utilizes the PWM rectifier power as an input power, that is, the input voltage of the converter is the PWM modulated pulse input voltage, there are few researches on the chaos phenomena. At present, only a segmented delay feedback control method is proposed. Although good control effect has been obtained, there are disadvantages such as difficulty in adjusting the control parameters. If the improper control parameters are selected, the predicted chaos control effect cannot be attained. Therefore, when the converter adopts the segmented delay feedback control method under the action of the pulse input voltage, how to study and determine a change rule of the control parameters on the premise of ensuring the stable operation of the system and further determine the stability range of the control parameters has important significance for ensuring the stable operation of the system.

SUMMARY OF THE PRESENT INVENTION

In order to solve the above technical problems, the present invention provides a method for determining a stability range of control parameters of a Buck-Boost converter based on segmented delay feedback control. Through the present invention, the stability range of the control parameters during the stable operation of the system can be determined.

The method for determining the stability range of the control parameters of the Buck-Boost converter based on the segmented delay feedback control provided by the present invention includes: establishing state differential equations respectively for two different level states of the converter under the action of the pulse input voltage by taking inductor current and capacitor voltage in the Buck-Boost converter as state variables; based on different input voltages of the Buck-Boost converter, correcting inductor reference current in the converter to obtain novel inductor reference current; based on the state differential equations and the novel inductor reference current, obtaining a discrete iteration mapping model of a system; based on the discrete iteration mapping model, obtaining function equations corresponding to an upper limit and a lower limit of the control parameters of the converter when the converter utilizes the segmented delay feedback control to realize the stable operation of the system under the action of the pulse input voltage, and determining a stability range of the corresponding control parameters by the function equations. The method specifically includes:

Step (1): establishing the state (i.e. a switch-on or switch-off state of a power switch tube in the converter) differential equations respectively for two different level states of the converter under the action of the pulse input voltage by taking the inductor current and capacitor voltage in the buck-boost converter as the state variables;

Step (2): based on different input voltages of the Buck-Boost converter, correcting the inductor reference current in the converter to obtain novel inductor reference current;

Step (3): based on the state differential equations in step (1) and the inductor reference current in step (2), obtaining the discrete iteration mapping model of the converter;

Step (4): based on the discrete iteration mapping model of the converter obtained in step (3), when the converter utilizes the segmented delay feedback control under the action of the pulse input voltage, obtaining a value range $(k_{2min}, k_{2max})$ of the control parameter $k_2$ realizing the stable operation of the system when the control parameter $k_1$ is given with any value;

Step (5): changing the given value of the control parameter $k_1$ according to certain increment, and obtaining a value range $(k_{2min}, k_{2max})$ corresponding to m groups of control parameters $k_2$ by adopting the same method;

Step (6): based on the obtained upper limit $k_{2max}$ and lower limit $k_{2min}$ of the m groups of control parameters $k_2$ as well as the corresponding value of the control parameter $k_1$, obtaining function equations between the upper limit $k_{2max}$ and the value of $k_1$ and between the lower limit $k_{2min}$ and the value of $k_1$ by adopting a value fitting method, wherein a range defined by the above two function equations is the stability range of the control parameters $k_1$ and $k_2$. The stable operation of the converter can be guaranteed by randomly selecting any value of $k_1$ and $k_2$ in the stability range.

Preferably, in step (1), the state differential equations are established respectively for two different level states of the converter under the action of pulse input voltage according to two different working states of a power switch tube Q in the converter by taking the inductor current $i_L$ and capacitor voltage $u_C$ in the Buck-Boost converter as the state variables, which is specifically:

State I: a switch-on state of a power switch Q.

When the pulse input voltage of the converter is a high level $U_{in1}$, the state differential equation of the converter is:

$$\dot{x} = A_1 x + B_1 U_{in1} \qquad (1)$$

When the pulse input voltage of the converter is a low level $U_{in2}$, the state differential equation of the converter is:

$$\dot{x} = A_1 x + B_1 U_{in2} \qquad (2)$$

State II: a switch-off state of the power switch Q.

At this moment, the working state of the converter is irrelevant to the input voltage, and the state differential equation is:

$$\dot{x} = A_2 X \qquad (3)$$

In the formula, $$x = \begin{bmatrix} i_L \\ u_C \end{bmatrix}$$

is a system state vector, $$A_1 = \begin{bmatrix} 0 & 0 \\ 0 & -\frac{1}{RC} \end{bmatrix}, B_1 = \begin{bmatrix} \frac{1}{L} \\ 0 \end{bmatrix}, A_2 = \begin{bmatrix} 0 & -\frac{1}{L} \\ \frac{1}{C} & -\frac{1}{RC} \end{bmatrix},$$

and L, C and R are an inductor, a capacitor and a load resistor respectively.

Preferably, the specific operation of step (2) is: based on different input voltages of the Buck-Boost converter, correcting the inductor reference current in the converter through the formula (4) to obtain novel inductor reference current;

$$I'_{ref} = \begin{cases} I_{ref} - \ln[1 + k_1(u_c(t) - u_c(t-T))] \\ I_{ref} - \ln[1 + k_2(u_c(t) - u_c(t-T))] \end{cases} \qquad (4)$$

In the formula, $I'_{ref}$ is the corrected novel inductor reference current; $I_{ref}$ is an initial value of the inductor reference current; $k_1$ and $k_2$ are control parameters when the input voltage of the converter is high level $U_{in1}$ and low level $U_{in2}$; $u_C$ is the capacitor voltage; and T is a switching cycle of the power switch tube Q.

Preferably, the step (3) includes the following specific operation:

Step (3-1): converting the state differential equations of the converter in step (1) into discrete equations;

Step (3-2): calculating the novel inductor reference current $I_{n+1}$ at the moment (n+1)T;

Step (3-3): based on the inductor current, the pulse input voltage, the discrete equations obtained in step (3-1) and the novel inductor reference current obtained in step (3-2), calculating the switch-on time $t_{n+1}$ of the power switch tube at the $(n+1)_{th}$ switching cycle;

Step (3-4): based on the data obtained in step (3-1)-step (3-3) and the inductor current and capacitor voltage at the nT moment, obtaining a uniform discrete iteration mapping model of the converter.

More preferably, the step (3-1) specifically includes: discretizing the time of the state differential equations in formula (1)-formula (3) to respectively obtain:

$$x(n+1) = G_1 x(n) + H_1 U_{in1} \qquad (5)$$

$$x(n+1) = G_1 x(n) + H_i U_{in2} \qquad (6)$$

$$x(n+1) = G_{2x}(n) \qquad (7)$$

In the formulas, $$x = \begin{bmatrix} i_L \\ u_C \end{bmatrix};$$

$i_n$ and $u_n$ respectively indicate the inductor current and the capacitor voltage at the moment nT.

$$G_1 = e^{A_1 t} = L^{-1}[(SI - A_1)^{-1}] = \begin{bmatrix} 1 & 0 \\ 0 & e^{\frac{-t}{RC}} \end{bmatrix},$$

$$G_2 = e^{A_2 t} = L^{-1}[(SI - A_2)^{-1}] = \begin{bmatrix} a_0 & \frac{a_1}{L} \\ \frac{-a_1}{C} & a_0 + \frac{1}{RC} a_1 \end{bmatrix},$$

$$H_1 = \left( \int_0^T e^{A_1 T} dt \right) B_1,$$

$$a_0 = -\frac{\tau e^{\tau t} \sin(\omega t) - \omega e^{\tau t} \cos(\omega t)}{\omega},$$

$$a_1 = \frac{-e^{\tau t} \sin(\omega t)}{\omega},$$

$$\omega = \sqrt{\frac{1}{LC} - \frac{1}{4R^2 C^2}}, \tau = -\frac{1}{2RC}.$$

The discrete equations of formula (1)-formula (3) can be obtained from formula (5)-formula (7), which are specifically as follows:

The discretization of the formula (1) can be expressed as:

$$\begin{cases} i_{n+1} = i_n + \frac{U_{in1}}{L} T \\ u_{n+1} = u_n e^{-\frac{T}{RC}} \end{cases} \qquad (8)$$

The discretization of the formula (2) can be expressed as:

$$\begin{cases} i_{n+1} = i_n + \frac{U_{in2}}{L} T \\ u_{n+1} = u_n e^{-\frac{T}{RC}} \end{cases} \qquad (9)$$

The discretization of the formula (3) can be expressed as:

$$\begin{cases} i_{n+1} = a_0 i_n + \frac{a_1 u_n}{L} \\ u_{n+1} = \frac{-a_1 i_n}{C} + \left( a_0 + \frac{1}{RC} a_1 \right) u_n \end{cases} \qquad (10)$$

In the formulas, $$a_0 = -\frac{\tau e^{\tau t}\sin(\omega t) - \omega e^{\tau t}\cos(\omega t)}{\omega}, \quad a_1 = \frac{-e^{\tau t}\sin(\omega t)}{\omega},$$

$$\omega = \sqrt{\frac{1}{LC} - \frac{1}{4R^2C^2}}, \quad \tau = -\frac{1}{2RC}.$$

More preferably, the step (3-2) is specifically as follows: $I_{n+1}$ is used to indicate the novel inductor reference current at the moment (n+1)T, and it can be obtained from the formula (4):

$$I_{n+1} = \begin{cases} I_{ref} - \ln[1 + k_1(u_n - u_{n+1})] \\ I_{ref} - \ln[1 + k_2(u_n - u_{n+1})] \end{cases} \quad (11)$$

In the formula, $u_n$ and $u_{n-1}$ respectively indicate the capacitor voltage at the moment nT and the moment (n−1)T.

More preferably, the step (3-3) is specifically as follows: based on the inductor current $i_n$ at the moment nT, the pulse input voltage $U_{in}$, the discretization equations shown in formulas (8) and (9), and the novel inductor reference current shown in formula (11), the switch-on time $t_{n+1}$ of the power switch tube in the converter at the $(n+1)^{th}$ switching cycle is obtained as follows:

$$t_{n+1} = \frac{L(I_{n+1} - i_n)}{U_{in}} \quad (12)$$

In the formula, $U_{in}$ is the input voltage of the converter (when the input voltage of the converter is the high level, $U_{in}=U_{in1}$; and when the input voltage of the converter is the low level, $U_{in}=U_{in2}$).

More preferably, the step (3-4) is specifically as follows: based on results obtained in step (3-1) and step (3-3), the inductor current and the capacitor voltage at the moment $(nT+t_{n+1})$ in the $(n+1)^{th}$ switching cycle are calculated; and based on the inductor current and the capacitor voltage at the moment (n+1)T obtained in step (3-1) and the inductor current in and the capacitor voltage $u_n$ at the moment nT, the uniform discrete iteration mapping model of the converter is obtained, which is concretely expressed as:

$$\begin{cases} i_{n+1} = e^{\tau t_m} M_1 \\ u_{n+1} = -Le^{\tau t_m}(M_2 + M_3) \end{cases} \quad (13)$$

In the formula, $M_1=(I_{n+1}\cos(\omega t_m)+a\sin(\omega t_m))$, $M_2=(\tau I_{n+1}+a\omega)\cos(\omega t_m)$, $M_3=(a\tau-\omega I_{n+1})\sin(\omega t_m)$, $$a = -\frac{1}{\omega}\left(\frac{u_n e^{2\tau i_{n-1}}}{L} + \tau I_{n+1}\right),$$

$$\tau = -\frac{1}{2RC}, \quad \omega = \sqrt{\frac{1}{LC} - \frac{1}{4R^2C^2}},$$

$t_m = T - t_{n+1}$.

Preferably, in step (4), based on the discrete iteration mapping model obtained in step (3), the control parameter $k_1$ is given with any value when the converter adopts the segmented delay feedback control under the action of the pulse input voltage; all parameters in the converter are collected to calculate the novel reference current value $I_{n+1}$ of the inductor at the moment (n+1)T in the $(n+1)^{th}$ switching cycle, the switch-on time $t_{n+1}$ of the power switch tube, and the inductor current $i_{n+1}$ and the capacitor voltage $u_{n+1}$ at the moment (n+1)T; whether the converter is operated stably is judged according to whether the output response $i_{n+1}$ and $u_{n+1}$ of the converter is equal to in and $u_n$, and the value range $(k_{2min}, k_{2max})$ of the control parameter $k_2$ realizing the stable operation is obtained by an iteration method.

More preferably, the step (4) specifically includes the following steps:

Step (4-1): letting the control parameter $k_1$ be any given value, setting the system parameters including the specific value of the high level $U_{in1}$ and low level $U_{in2}$ of the pulse input voltage, the initial value $I_{ref}$ of the inductor reference current, maximum iteration times N, an initial value $k_{2.0}$ of the control parameter $k_2$, an increment $\Delta k_2$ of the control parameter $k_2$, and maximum repetition times B;

Step (4-2): collecting the pulse input voltage $U_{in}$ at the moment nT and determining the corresponding control parameter ($k_1$ when the input voltage is high level $U_{in1}$ and $k_2$ when the input voltage is low level $U_{in2}$) based on the pulse input voltage at the moment, and calculating the novel reference current value $I_{n+1}$ of the inductor at the moment (n+1)T in the $(n+1)^{th}$ switching cycle through the formula (11);

Step (4-3): based on the pulse input voltage $U_{in}$ and the inductor current $i_n$ at the moment nT, calculating the switch-on time $t_{n+1}$ of the power switch tube in the $(n+1)^{th}$ switching cycle through the formula (12);

Step (4-4): according to the formula (14), calculating the inductor current $i_{n+1}$ and capacitor voltage $U_{n+1}$ at the moment (n+1)T in the $(n+1)^{th}$ switching cycle;

Step (4-5): judging whether the output responses $i_{n+1}$ and $u_{n+1}$ of the system are equal to in and un; if yes, indicating the stable operation of the system, and carrying out the step (4-7); otherwise, indicating that the system cannot be operated stably, and carrying out the step (4-6);

Step (4-6): judging whether the iteration times n is less than the maximal iteration times N; if yes (that is, n is less than N), n plus 1, and returning to step (4-2); otherwise, when the iteration times n is greater than or equal to the maximal iteration times N, the system cannot be operated stably either, carrying out the step (4-9);

Step (4-7): gradually increasing the control parameter $k_2$ by $\Delta k_2$ on the basis of $k_{2.0}$; after each gradual increase, judging whether the system is operated stably according to the method described in step (4-2)-step (4-5); and if yes, continuing the gradual increase until the system cannot be operated stably, and at this time, letting $k_{2max}=k_2$, and then carrying out the step (4-8);

Step (4-8): gradually decreasing the control parameter $k_2$ by $\Delta k_2$ on the basis of $k_{2.0}$; after each gradual decrease, judging whether the system is operated stably according to the method described in step (4-2)-step (4-5), and if yes, continuing the gradual decrease until the system cannot be operated stably; and at this time, letting $k_{2min}=k_2$, and carrying out the step (4-13);

Step (4-9): gradually increasing the control parameter $k_2$ by $\Delta k_2$ on the basis of $k_{2.0}$ (because the step 4-7-step 4-8 cannot be carried out, it means that the improper initial value $k_{2.0}$ of the control parameter $k_2$ is selected, the control parameter $k_2$ should be based on the initial value $k_{2.0}$, and the initial value $k'_{2.0}$ of the control parameter $k_2$ is redetermined by an iteration method, thereby determining the stability range); judging whether the system is operated stably according to the method described in step (4-2)-step (4-5); if the system is operated stably, letting $k_{2min}=k_2$, and then carrying out the step (4-10); otherwise, judging whether the increase times b is less than the maximal repetition times B; if the increase times b is less than the maximal repetition times B, continuously gradually increasing the control parameter $k_2$ by $\Delta k_2$, and judging whether the system is operated stably according to the method described in step (4-2)-step (4-5); if the system is operated stably, letting $k_{2min}=k_2$, and then carrying out the step (4-10); otherwise, when the increase times b is greater than or equal to the maximal repetition times B, if the system cannot be operated stably, carrying out the step (4-11);

Step (4-10): gradually increasing the control parameter $k_2$ by $\Delta k_2$ on the basis of $k_2$, and judging whether the system is operated stably according to the method described in step (4-2)-step (4-5); if yes, continuing the gradual increase until the system cannot be operated stably, and at this time, letting $k_{2max}=k_2$, and then carrying out the step (4-13);

Step (4-11): gradually decreasing the control parameter $k_2$ by $\Delta k_2$ on the basis of $k_{2,0}$ (when the repetition times is greater than the given times, the system cannot be operated stably either, it means that the minimal value of the control parameter $k_2$ in the stability range cannot be found and it should try to find the maximal value of the control parameter $k_2$ in the stability range); judging whether the system is operated stably according to the method described in step (4-2)-step (4-5); if yes, letting $k_{2max}=k_2$, and then carrying out the step (4-12); otherwise, continuing gradual decrease until the system is operated stably, and at this time, letting $k_{2max}=k_2$, and then carrying out the step (4-12);

Step (4-12): gradually decreasing the control parameter $k_2$ by $\Delta k_2$; judging whether the system is operated stably according to the method described in step (4-2)-step (4-5); if yes, continuing the gradual decrease until the system cannot be operated stably; and letting $k_{2min}=k_2$, and carrying out the step (4-13);

Step (4-13): based on the upper limit $k_{2max}$ and the lower limit $k_{2min}$ of the control parameter $k_2$, obtaining the value range ($k_{2min}$, $k_{2max}$) of the control parameter $k_2$ realizing the stable operation.

Preferably, in the step (5), changing the given value of the control parameter $k_1$ according to certain increment, and obtaining the value range ($k_{2min}$, $k_{2max}$) corresponding to m groups of control parameters $k_2$ by adopting the same method, wherein the specific value of the increment $\Delta k_1$ of the control parameter $k_1$ and the specific data of m are determined according to the requirements.

Preferably, in the step (6), based on the obtained upper limit $k_{2max}$ and lower limit $k_{2min}$ of the m groups of control parameters $k_2$ as well as the corresponding value of the control parameter $k_1$, obtaining function equations between the upper limit $k_{2max}$ and the value of $k_1$ and between the lower limit $k_{2min}$ and the value of $k_1$ by adopting a value fitting method, wherein a range defined by the above two function equations is the stability range of the control parameters $k_1$ and $k_2$. The stable operation of the system can be guaranteed by randomly selecting any value of $k_1$ and $k_2$ in the stability range.

Compared with the prior art, the present invention establishes the state differential equations respectively for two different level states of the converter under the action of the pulse input voltage by taking the inductor current and capacitor current in the Buck-Boost converter as the state variables; based on different input voltages of the Buck-Boost converter, the inductor reference current in the converter is corrected to obtain the novel inductor reference current; based on the state differential equations and the novel inductor reference current, the discrete iteration mapping model of the system is obtained; based on the discrete iteration mapping model, the function equations corresponding to the upper limit and the lower limit of the control parameters of the converter are obtained when the segmented delay feedback control is used to realize the stable operation of the system under the action of the pulse input voltage, and the stability range of the corresponding control parameters can be determined by the function equations. The present invention has the advantages: when the converter directly utilizes the PWM rectifier power as the input power, that is, the input voltage of the converter is the PWM modulated pulse input voltage, the segmented delay feedback control method is used for the chaos phenomenon. The present invention studies and determines the change rule of the control parameters on the premise of ensuring the stable operation of the system to determine the stability range of the control parameters, thereby achieving the predicted chaos control effect, and having important significance for guaranteeing the stable operation of the Buck-Boost converter.

DETAILED DESCRIPTION OF THE PRESENT INVENTION

The present invention is further described in detail below in combination with the drawings and embodiments.

Figure 1:
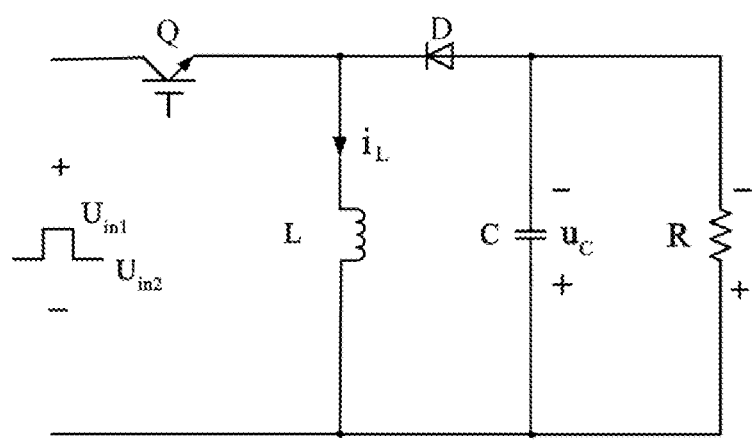
FIG. 1 is a topological structural diagram of a main circuit of a Buck-Boost converter of the present invention.

FIG. 1 is a topological structural diagram of a main circuit of a Buck-Boost converter of the present invention. The converter includes a pulse power $U_{in}$ (including high level $U_{in1}$ and low level $U_{in2}$), a power switch Q, an inductor L, a capacitor C, a diode D and a load resistor R. A collector of the power switch Q is connected with a positive electrode of the pulse power $U_{in}$, an emitter of the power switch Q is connected with a cathode of the diode D and one end of the inductor L, and an anode of the diode D is connected with a negative electrode of the capacitor C and one end of the load resistor R. The other end of the inductor L is connected with a positive electrode of the capacitor C and the other end of the load resistor R and then connected to a negative electrode of the pulse power $U_{in}$.

Figure 2:
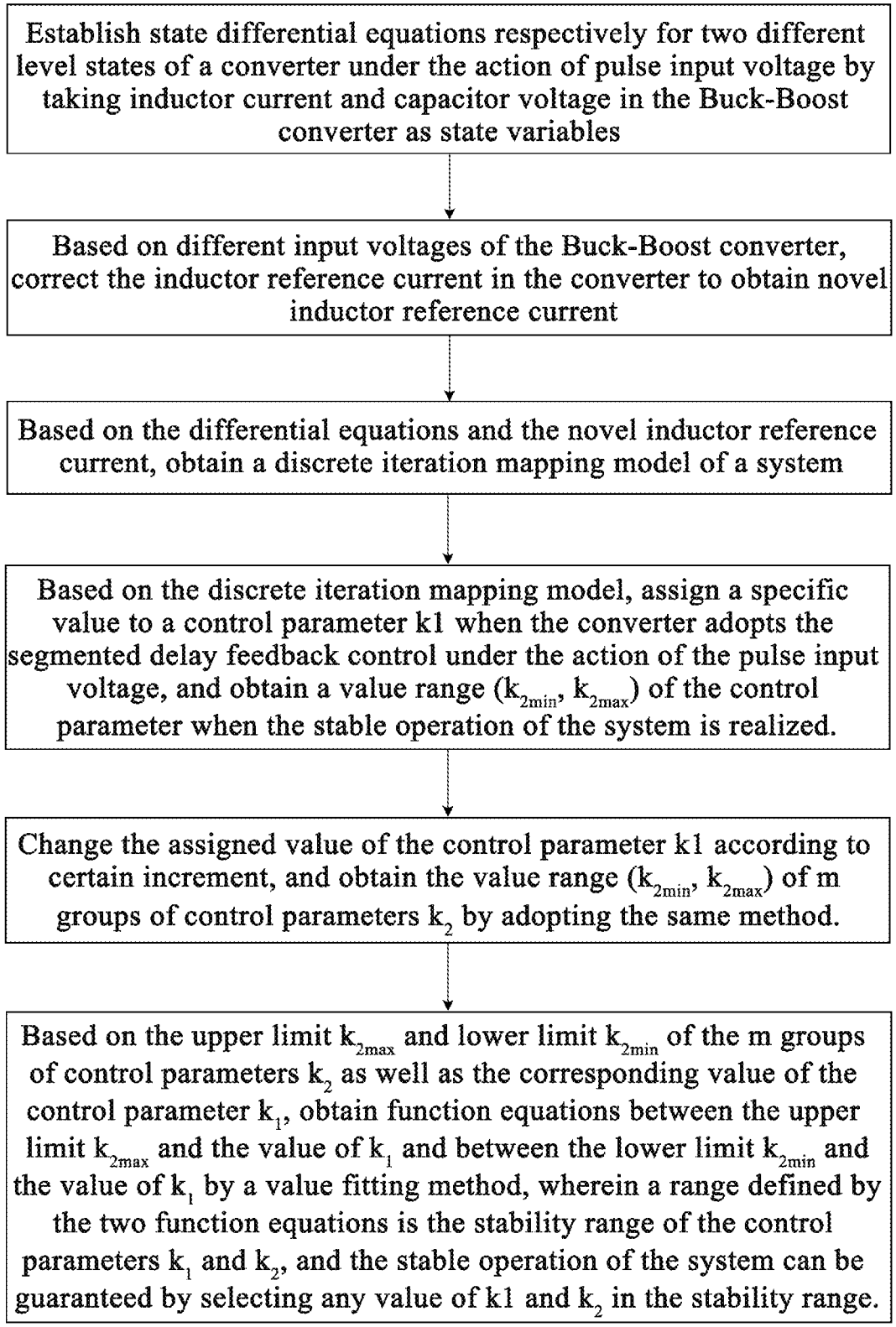
FIG. 2 is a flow chart of a method for determining a stability range of control parameters of the Buck-Boost converter based on segmented delay feedback control provided by embodiments of the present invention.

FIG. 2 is a flow chart of a method for determining a stability range of control parameters of a Buck-Boost converter based on segmented delay feedback control provided by the present invention. The method includes the following steps:

Step (1): inductor current and capacitor voltage in the Buck-Boost converter are taken as state variables to establish state differential equations respectively for two different level states of the converter under the action of the pulse input voltage:

The inductor current $i_L$ and the capacitor voltage $u_C$ in the Buck-Boost converter are taken as the state variables to establish the state differential equations respectively for two different level states of the converter under the action of the pulse input voltage according to two different level states of the power switch tube Q in the converter, which is specifically as follows:

State I (switch-on state of a power switch Q):

When the pulse input voltage of the converter is a high level $U_{im1}$, the state differential equation of the converter is:

$$\dot{x}=A_1x+B_1U_{in1} \quad (1)$$

When the pulse input voltage of the converter is a low level $U_{in2}$, the state differential equation of the converter is:

$$\dot{x}=A_1x+B_1U_{in2} \quad (2)$$

State II (switch-off state of the power switch Q):

At this moment, the working state of the converter is irrelevant to the input voltage, and the state differential equation of the converter is as follows:

$$\dot{x}=A_2X \quad (3)$$

In the formula, $$x = \begin{bmatrix} i_L \\ u_C \end{bmatrix}$$

is a system state vector, $$A_1 = \begin{bmatrix} 0 & 0 \\ 0 & -\frac{1}{RC} \end{bmatrix}, B_1 = \begin{bmatrix} \frac{1}{L} \\ 0 \end{bmatrix},$$

$$A_2 = \begin{bmatrix} 0 & -\frac{1}{L} \\ \frac{1}{C} & -\frac{1}{RC} \end{bmatrix},$$

and L, C and R are inductor, capacitor and load resistor respectively.

Step (2): based on different input voltages of the Buck-Boost converter, the inductor reference current in the converter is corrected to obtain novel inductor reference current, which is specifically as follows:

$$I'_{ref} = \begin{cases} I_{ref} - \ln[1 + k_1(u_c(t) - u_c(t-T))] \\ I_{ref} - \ln[1 + k_2(u_c(t) - u_c(t-T))] \end{cases} \quad (4)$$

In the formula, $I'_{ref}$ is the corrected novel inductor reference current; $I_{ref}$ is an initial value of the inductor reference current; $k_1$ and $k_2$ are control parameters when the input voltage of the converter is high level $U_{in1}$ and low level $U_{in2}$; $u_C$ is the capacitor voltage; and T is a switching cycle of the power switch tube Q.

Step (3): based on the state differential equations in step (1) and the novel inductor reference current in step (2), a discrete iteration mapping model of the system is obtained, which specifically includes the following steps:

Step (3-1): the time of the state differential equation in formula (1)-formula (3) is discretized to respectively obtain:

$$x(n+1)=G_1x(n)+H_1U_{in1} \quad (5)$$

$$x(n+1)=G_1x(n)+H_iU_{in2} \quad (6)$$

$$x(n+1)=G_2x(n) \quad (7)$$

In the formulas, $$x = \begin{bmatrix} i_L \\ u_C \end{bmatrix};$$

$i_n$ and $u_n$ respectively indicate the inductor current and the capacitor voltage at the moment nT.

$$G_1 = e^{A_1 t} = L^{-1}[(SI - A_1)^{-1}] = \begin{bmatrix} 1 & 0 \\ 0 & e^{\frac{-t}{RC}} \end{bmatrix},$$

$$G_2 = e^{A_2 t} = L^{-1}[(SI - A_2)^{-1}] = \begin{bmatrix} a_0 & \frac{a_1}{L} \\ \frac{-a_1}{C} & a_0 + \frac{1}{RC}a_1 \end{bmatrix},$$

$$H_1 = \left(\int_0^T e^{A_1 T} dt\right) B_1,$$

$$a_0 = -\frac{\tau e^{\tau t}\sin(\omega t) - \omega e^{\tau t}\cos(\omega t)}{\omega}, a_1 = \frac{-e^{\tau t}\sin(\omega t)}{\omega},$$

$$\omega = \sqrt{\frac{1}{LC} - \frac{1}{4R^2C^2}}, \tau = -\frac{1}{2RC}.$$

The discrete equations of formula (1)-formula (3) can be obtained from formula (5)-formula (7), which are specifically as follows:

The discretization of the formula (1) can be expressed as:

$$\begin{cases} i_{n+1} = i_n + \frac{U_{in1}}{L}T \\ u_{n+1} = u_n e^{-\frac{T}{RC}} \end{cases} \quad (8)$$

The discretization of the formula (2) can be expressed as:

$$\begin{cases} i_{n+1} = i_n + \frac{U_{in2}}{L}T \\ u_{n+1} = u_n e^{-\frac{T}{RC}} \end{cases} \quad (9)$$

The discretization of the formula (3) can be expressed as:

$$\begin{cases} i_{n+1} = a_0 i_n + \frac{a_1 u_n}{L} \\ u_{n+1} = \frac{-a_1 i_n}{C} + \left(a_0 + \frac{1}{RC}a_1\right)u_n \end{cases} \quad (10)$$

In the formulas, $$a_0 = -\frac{\tau e^{\tau t}\sin(\omega t) - \omega e^{\tau t}\cos(\omega t)}{\omega}, a_1 = \frac{-e^{\tau t}\sin(\omega t)}{\omega},$$

$$\omega = \sqrt{\frac{1}{LC} - \frac{1}{4R^2C^2}}, \tau = -\frac{1}{2RC}.$$

More preferably, the step (3-2) is specifically as follows: $I_{n+1}$ is used to indicate the novel inductor reference current at the moment (n+1)T, and it can be obtained from the formula (4):

$$I_{n+1} = \begin{cases} I_{ref} - \ln[1 + k_1(u_n - u_{n-1})] \\ I_{ref} - \ln[1 + k_2(u_n - u_{n-1})] \end{cases} \quad (11)$$

In the formula, $u_n$ and $u_{n-1}$ respectively indicate the capacitor voltage at the moment nT and the moment (n-1)T.

More preferably, the step (3-3) is specifically as follows: based on the inductor current $i_n$ at the moment nT, the pulse input voltage $U_{in}$, the discretization equations shown in formulas (8) and (9), and the novel inductor reference current shown in formula (11), the switch-on time $t_{n+1}$ of the power switch tube in the converter at the $(n+1)^{th}$ switching cycle is obtained as follows:

$$t_{n+1} = \frac{L(I_{n+1} - i_a)}{U_{in}} \quad (12)$$

In the formula, $U_{in}$ is the input voltage of the converter (when the input voltage of the converter is the high level, $U_{in}=U_{in1}$; and when the input voltage of the converter is the low level, $U_{in}=U_{in2}$).

Step (3-4): according to the formula (12), formula (8) or formula (9) (when the input voltage of the converter in the present embodiment is high level, the formula (8) is used; and when the input voltage of the converter is low level, the formula (9) is used), the inductor current and the capacitor voltage at the moment $(nT+t_{n+1})$ in the $(n+1)^{th}$ switching cycle can be obtained as follows:

$$\begin{cases} i_{t_{n+1}} = I_{n+1} \\ u_{t_{n+1}} = u_n e^{-\frac{t_{n+1}}{RC}} \end{cases} \quad (13)$$

The inductor current and the capacitor voltage at the moment $(nT+t_{n+1})$ obtained according to the formula (13) are initial values; the inductor current and the capacitor voltage at the moment (n+1)T moment can be obtained via the formula (10), that is, a uniform discrete iteration mapping model of the entire converter can be obtained, which is specifically as:

$$\begin{cases} i_{n+1} = e^{\tau/m} M_1 \\ u_{n+1} = -Le^{\tau/m}(M_2 + M_3) \end{cases} \quad (14)$$

In the formula, $M_1=(I_{n+1}\cos(\omega t_m)+a\sin(\omega t_m))$, $M_2=(\tau I_{n+1}+a\omega)\cos(\omega t_m)$, $M_3=(a\tau-\omega I_{n+1})\sin(\omega t_m)$, $$a = -\frac{1}{\omega}\left(\frac{u_n e^{\tau I_{n+1}}}{L} + \tau I_{n+1}\right), \tau = -\frac{1}{2RC}, \omega = \sqrt{\frac{1}{LC} - \frac{1}{4R^2C^2}},$$

$t_m = T - t_{n+1}$.

Figure 3:
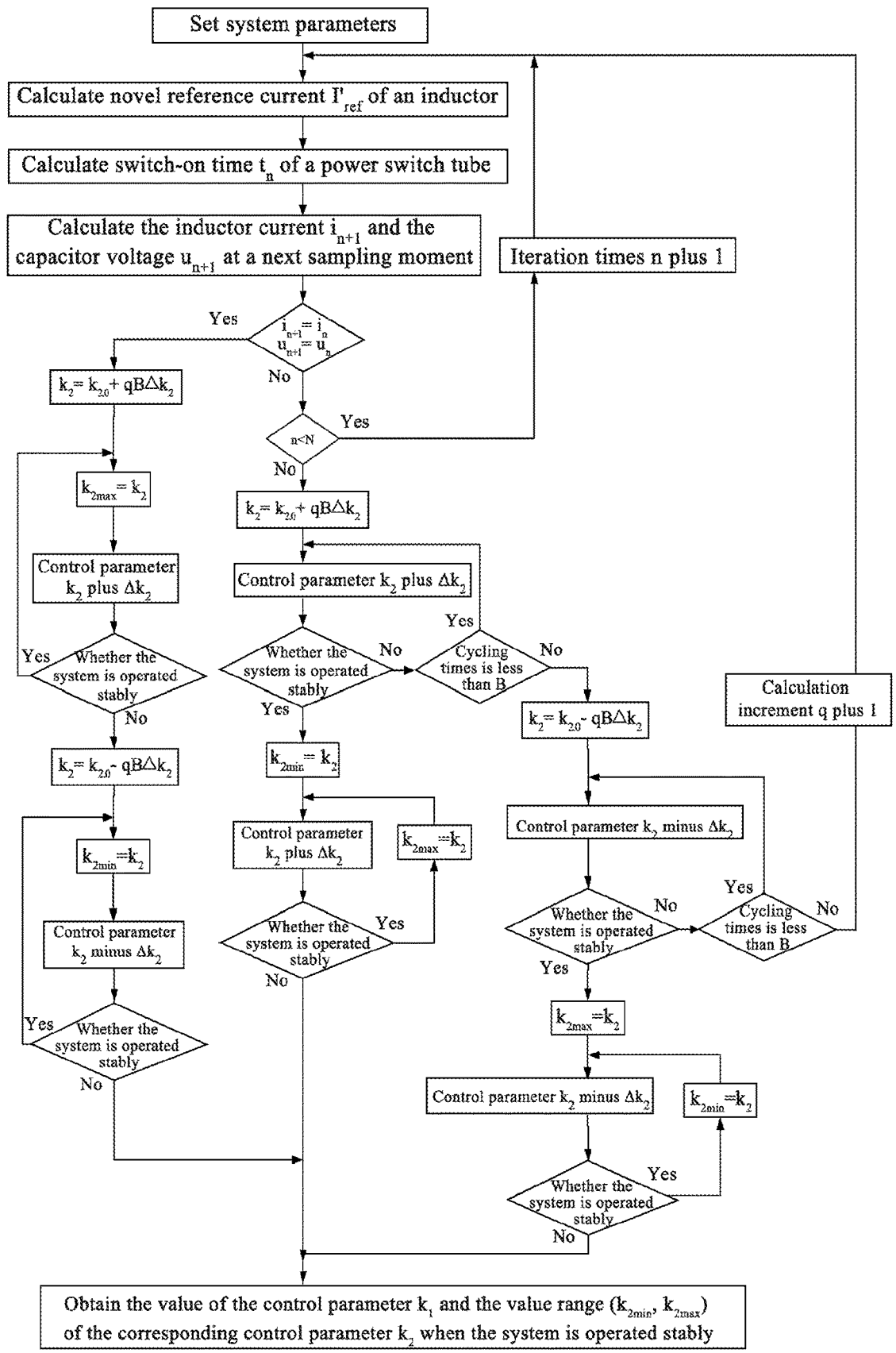
FIG. 3 is a flow chart of obtaining a value range ($k_{2min}$, $k_{2max}$) of a control parameter $k_2$ realizing the stable operation of a system provided by embodiments of the present invention.

It is the switch-off time of the power switch tube in the $(n+1)_{th}$ switching cycle. Step (4): based on the discrete iteration mapping model (14) of the converter obtained in step (3), when the converter adopts the segmented delay feedback control under the action of the pulse input voltage, the control parameter $k_1$ is given with a specific value to obtain a value range $(k_{2min}, k_{2max})$ of the control parameter $k_2$ realizing the stable operation of the system. FIG. 3 is a flow chart of obtaining the value range $(k_{2min}, k_{2max})$ of the control parameter $k_2$ when the stable operation of the system is realized provided by the embodiments of the present invention (min represents a minimal value herein, max represents a maximal value, and others are not repeated), which specifically includes the following steps:

Step (4-1): system parameters (including the specific values of the high level $U_{in1}$ and low level $U_{in2}$ of the pulse input voltage, the initial value $I_{ref}$ of the inductor reference current, maximum iteration times N, an increment $\Delta k_2$ of the control parameter $k_2$, and maximum repetition times B) are set; and letting control parameter $k_1$ be given with any specific value, the control parameter $k_2$ is given with the initial value $k_{2,0}$;

Step (4-2): the pulse input voltage $U_{in}$ at the moment nT is collected and the corresponding control parameter is determined based on the pulse input voltage; and then the novel reference current value $I_{n+1}$ of the inductor at the moment (n+1)T is calculated based on the capacitor voltage and the formula (11) obtained in step (3);

Step (4-3): based on the pulse input voltage $U_{in}$ and the inductor current $i_n$ at the moment nT, the switch-on time $t_{n+1}$ of the power switch tube in the $(n+1)^{th}$ switching cycle is calculated according to the formula (12) obtained in step (3);

Step (4-4): according to the formula (14) obtained in step (3), the inductor current $i_{n+1}$ and inductor voltage un-pi at the moment (n+1)T are calculated;

Step (4-5): whether the output responses $i_{n+1}$ and $u_{n+1}$ of the system are equal to in and $u_n$ in the previous switching cycle is judged based on the inductor current and the capacitor voltage calculated in step (4-4); if $i_{n+1}=i_n$ and $u_{n+1}=u_n$, it indicates that the system is operated stably, and then the step (4-7) is carried out; and if $i_{n+1}\neq i_n$ and $U_{n+1}\neq u_n$, it indicates the system cannot be operated stably, and the step (4-6) is carried out;

Step (4-6): whether the iteration times n is less than the maximal iteration times N is judged; if the iteration times n is less than the maximal iteration times N, n plus 1, and then the step (4-2) is carried out; and if the iteration times n is greater than or equal to the maximal iteration times N, the step (4-9) is carried out;

Step (4-7): by letting the control parameter $k_2$ be $k_{2,0}+\Delta k_2$, whether the system is operated stably is judged according to the method described in step (4-2)-step (4-5); if the system cannot be operated stably, letting $k_{2max}=k_2$, the step (4-8) is carried out; if the system is operated stably, letting the control parameter $k_2$ gradually increase by $\Delta k_2$ on the basis of $k_{2,0}+\Delta k_2$ until the system cannot be operated stably, and at this time, letting $k_{2max}=k_2$, the step (4-8) is carried out;

Step (4-8): letting the control parameter $k_2$ be $k_{2,0}-\Delta k_2$ (in the present embodiment, the condition that $k_{2,0}$ is $k_{2min}$ is considered); whether the system is operated stably is judged according to the method described in step (4-2)-step (4-5); if the system cannot be operated stably, letting $k_{2min}=k_2$, the step (4-13) is carried out; and if the system is operated stably, letting the control parameter $k_2$ gradually decrease by $\Delta k_2$ on the basis of $k_{2,0}-\Delta k_2$ until the system cannot be operated stably, and at this time, letting $k_{2min}=k_2$, the step (4-13) is carried out;

Step (4-9): letting the control parameter $k_2$ be $k_{2,0}+\Delta k_2$; whether the system is operated stably is judged according to the method described in step (4-2)-step (4-5); if the system is operated stably, letting $k_{2min}=k_2$, and the step (4-10) is carried out; if the system cannot be operated stably, letting the control parameter $k_2$ gradually increase by $\Delta k_2$ on the basis of $k_{2,0}+\Delta k_2$, and whether the system is operated stably is judged according to the method described in step (4-2)-step (4-5) after each gradual increase; when the increase times b is less than the maximal repetition times B, the system is operated stably, and letting $k_{2min}=k_2$, and the step (4-10) is carried out; and when the increase times b is greater than or equal to the maximal repetition times B, the system cannot be operated stably either, and then the step (4-11) is carried out;

Step (4-10): letting the control parameter $k_2$ be $k_{2min}+\Delta k_2$; whether the system is operated stably according to the method described in step (4-2)-step (4-5); if the system cannot be operated stably, letting $k_{2max}=k_2$, and the step (4-13) is carried out; if the system is operated stably, letting the control parameter $k_2$ gradually increase by $\Delta k_2$ on the basis of $k_{2,0}+\Delta k_2$ until the system cannot be operated stably, and at this time, letting $k_{2max}=k_2$, the step (4-13) is carried out;

Step (4-11): letting the control parameter $k_2$ be $k_{2,0}-\Delta k_2$, and whether the system is operated stably according to the method described in step (4-2)-step (4-5); if the system is operated stably, letting $k_{2max}=k_2$, and the step (4-12) is carried out; if the system cannot be operated stably, letting the control parameter $k_2$ gradually decrease by $\Delta k_2$ on the basis of $k_{2,0}-\Delta k_2$ until the system is operated stably, and at this time, letting $k_{2max}=k_2$, and then the step (4-12) is carried out;

Step (4-12): letting the control parameter $k_2$ be $k_{2max}-\Delta k_2$, and whether the system is operated stably is judged according to the method described in step (4-2)-step (4-5); if the system cannot be operated stably, letting $k_{2min}=k_2$; if the system is operated stably, letting the control parameter $k_2$ gradually decrease by $\Delta k_2$ on the basis of $k_{2max}-\Delta k_2$ until the system cannot be operated stably, and at this time, letting $k_{2min}=k_2$, and then the step (4-13) is carried out;

Step (4-13): based on the upper limit $k_{2max}$ and the lower limit $k_{2min}$ of the control parameter $k_2$ obtained in step (4-7) and step (4-8) or step (4-10) and step (4-9) or step (4-11) and step (4-12), the value range ($k_{2min}$, $k_{2max}$) of the control parameter $k_2$ when the stable operation of the system is realized is obtained; it should be noted that the upper limit $k_{2max}$ and the lower limit $k_{2min}$ of the control parameter $k_2$ obtained in step (4-7) and step (4-8) or step (4-10) and step (4-9) or step (4-11) and step (4-12) cannot be combined randomly, that is, the value range ($k_{2min}$, $k_{2max}$) of the control parameter $k_2$ when the system is operated stably is necessarily the upper limit $k_{2max}$ of the control parameter $k_2$ calculated in step (4-7) and the lower limit $k_{2min}$ of the control parameter $k_2$ calculated in step (4-8); similarly, the upper limit $k_{2min}$ of the control parameter $k_2$ calculated in step (4-10) necessarily corresponds to the lower limit $k_{2min}$ of the control parameter $k_2$ calculated in step (4-9); and the upper limit $k_{2max}$ of the control parameter $k_2$ calculated in step (4-11) necessarily corresponds to the lower limit $k_{2min}$ of the control parameter $k_2$ calculated in step (4-12).

Step (5): the given value of the control parameter $k_1$ is changed according to certain increment $\Delta k_1$, and a value range ($k_{2min}$, $k_{2max}$) corresponding to m groups of control parameters $k_2$ is obtained by adopting the same method (the step 5 differs from the step 4 only in the value of $k_1$);

Step (6): based on the upper limit $k_{2max}$ and lower limit $k_{2min}$ of the m groups of control parameters $k_2$ obtained in steps (4)-(5) and the corresponding value of the control parameter $k_1$, function equations between the upper limit $k_{2max}$ and the value of $k_1$ and between the lower limit $k_{2min}$ and the value of $k_1$ are obtained by a value fitting method, wherein the value fitting method prefers the least square method, and the obtained function equations are respectively as follows:

(a) The function equation between the upper limit $k_{2max}$ of the control parameter $k_2$ and the value of $k_1$ is:

$$f_{k2max}(k_1)=a_1 e^{b_1 k_1}+c_1 e^{d_1 k_1} \qquad (15)$$

In the formula, $a_1$, $b_1$, $c_1$ and $d_1$ are coefficients respectively. The coefficients are determined by the least square method.

(b) The function equation between the lower limit $k_{2min}$ of the control parameter $k_2$ and the value of $k_1$ is:

$$f_{k2min}(k_1)=a_2 e^{b_2 k_1}+c_2 e^{d_2 k_1} \qquad (16)$$

In the formula, $a_2$, $b_2$, $c_2$ and $d_2$ are coefficients respectively. The coefficients are determined by the least square method.

The range defined by the above two function equations is the stability range of the control parameters $k_1$ and $k_2$. Any value of $k_1$ and $k_2$ in the stability range can ensure the stable operation of the system, thereby achieving the predicted chaos control effect.

We claim:

1. A method for determining a stability range of a Buck-Boost converter based on segmented delay feedback control, comprising:

providing a pulse power, a power switch tube, an inductor, a capacitor and a load resistor in the Buck-Boost converter, wherein the pulse power is configured to generate a pulse input voltage;

with inductor current $i_L$ and capacitor voltage $u_C$ in the Buck-Boost converter as state variables, establishing a first state differential equation of the Buck-Boost converter when the power switch tube is in a switch-on state and the pulse input voltage is a first level $U_{in1}$; establishing a second state differential equation of the Buck-Boost converter when the power switch tube is in a switch-on state and the pulse input voltage is a second level $U_{in2}$; establishing a third state differential equation of the Buck-Boost converter when the power switch tube is in a switch-off state and a working state of the Buck-Boost converter is irrelevant to the pulse input voltage, wherein the first state differential equation of the Buck-Boost converter is:

$$\dot{x}=A_1 x+B_1 U_{in1};$$

the second state differential equation of the Buck-Boost converter is:

$$\dot{x}=A_1 x+B_1 U_{in2};$$

and the third state differential equation is:

$$\dot{x}=A_2 x;$$

in the first, second and third state differential equations:

$$x = \begin{bmatrix} i_L \\ u_C \end{bmatrix}$$

is a system state vector, $$A_1 = \begin{bmatrix} 0 & 0 \\ 0 & -\dfrac{1}{RC} \end{bmatrix}, B_1 = \begin{bmatrix} \dfrac{1}{L} \\ 0 \end{bmatrix}, A_2 = \begin{bmatrix} 0 & -\dfrac{1}{L} \\ \dfrac{1}{C} & -\dfrac{1}{RC} \end{bmatrix},$$

and L, C and R are the inductor, the capacitor and the load resistor in the Buck-Boost converter respectively;

based on the pulse input voltage of the Buck-Boost converter, correcting inductor reference current in the Buck-Boost converter to obtain corrected inductor reference current;

based on the first, second and third state differential equations and the corrected inductor reference current, obtaining a discrete iteration mapping model of the Buck-Boost converter;

based on the discrete iteration mapping model, obtaining function equations corresponding to an upper limit and a lower limit of a control parameter $k_1$ and a control parameter $k_2$, and determining a stability range of the control parameter $k_1$ and the control parameter $k_2$ through the function equations, wherein $k_1$ and $k_2$ are control parameters when the pulse input voltage is the first level $U_{in1}$ and the second level $U_{in2}$.

2. A method for determining a stability range of control parameters of a Buck-Boost converter based on segmented delay feedback control, comprising:

providing a pulse power, a power switch tube, an inductor, a capacitor and a load resistor, wherein the pulse power is configured to generate a pulse input voltage;

step (1): with inductor current $i_L$ and capacitor voltage $u_C$ in the Buck-Boost converter as state variables, establishing a first state differential equation of the Buck-Boost converter when the power switch tube is in a switch-on state and the pulse input voltage is a first level $U_{in1}$; establishing a second state differential equation of the Buck-Boost converter when the power switch tube is in a switch-on state and the pulse input voltage is a second level $U_{in2}$; establishing a third state differential equation of the Buck-Boost converter when the power switch tube is in a switch-off state and a working state of the Buck-Boost converter is irrelevant to the pulse input voltage, wherein the first state differential equation of the Buck-Boost converter is:

$$\dot{x} = A_1 x + B_1 U_{in1};$$

the second state differential equation of the Buck-Boost converter is:

$$\dot{x} = A_1 x + B_1 U_{in2};$$

and the third state differential equation is:

$$\dot{x} = A_2 x;$$

in the first, second and third state differential equations, $$x = \begin{bmatrix} i_L \\ u_C \end{bmatrix}$$

is a system state vector, $$A_1 = \begin{bmatrix} 0 & 0 \\ 0 & -\dfrac{1}{RC} \end{bmatrix}, B = \begin{bmatrix} \dfrac{1}{L} \\ 0 \end{bmatrix}, A_2 = \begin{bmatrix} 0 & -\dfrac{1}{L} \\ \dfrac{1}{C} & -\dfrac{1}{RC} \end{bmatrix},$$

and L, C and R are the inductor, the capacitor and the load resistor respectively;

step (2): based on the pulse input voltage of the Buck-Boost converter, correcting the inductor reference current in the Buck-Boost converter to obtain corrected inductor reference current;

step (3): based on the first, second and third state differential equations in step (1) and the corrected inductor reference current in step (2), obtaining a discrete iteration mapping model of the Buck-Boost converter;

step (4): based on the discrete iteration mapping model of the Buck-Boost converter obtained in step (3), obtaining a value range ($k_{2mim}$, $k_{2max}$) of a control parameter $k_2$ when a control parameter $k_1$ is given with any value;

step (5): changing the given value of the control parameter $k_1$ according to certain increment to obtain a value range ($k_{2min}$, $k_{2max}$) corresponding to m groups of control parameters $k_2$, wherein m is an integer greater than 1;

step (6): based on $k_{2max}$ and $k_{2min}$ of the m groups of control parameters $k_2$ as well as the given value of the control parameter $k_1$, obtaining a first function equation between $k_{2max}$ and the given value of $k_1$ and obtaining a second function equation between $k_{2min}$ and the given value of $k_1$ by adopting a value fitting method, wherein a range defined by the first and second function equations is the stability range of the control parameters $k_1$ and $k_2$, and stable operation of the Buck-Boost converter can be guaranteed by randomly selecting any value of $k_1$ and $k_2$ in the stability range;

wherein $k_1$ and $k_2$ are control parameters respectively when the pulse input voltage is the first level $U_{in1}$ and the second level $U_{in2}$.

3. The method for determining the stability range of the control parameters of the Buck-Boost converter based on the segmented delay feedback control according to claim 2, wherein in step (2), the corrected inductor reference current is obtained by correcting the inductor reference current in the Buck-Boost converter according to $$I'_{ref} = \begin{cases} I_{ref} - \ln[1 + k_1(u_c(t) - u_c(t-T))] \\ I_{ref} - \ln[1 + k_2(u_c(t) - u_c(t-T))] \end{cases} \quad (4)$$

in the formula, $I'_{ref}$ is the corrected inductor reference current; $I_{ref}$ is an initial value of the inductor reference current; $k_1$ and $k_2$ are control parameters when the pulse input voltage is the first level $U_{in1}$ and the second level $U_{in2}$; $u_C$ is the capacitor voltage; T is a switching cycle of the power switch tube; and t is a moment.

4. The method for determining the stability range of the control parameters of the Buck-Boost converter based on the segmented delay feedback control according to claim 2, wherein the step (3) comprises:

step (3-1): discretizing the first, second and third state differential equations of the Buck-Boost converter in step (1) respectively to obtain discrete equations;

step (3-2): calculating corrected inductor reference current $I_{n+1}$ at a moment (n+1)T, wherein n is an integer greater than zero;

step (3-3): based on the inductor current, the pulse input voltage, the discrete equations obtained in step (3-1) and the corrected inductor reference current obtained in step (3-2), calculating switch-on time $t_{n+1}$ of the power switch tube at a $(n+1)^{th}$ switching cycle;

step (3-4): based on the discrete equations obtained in step (3-1), $I_{n+1}$ obtained in step (3-2), $t_{n+1}$ obtained in step (3 3), obtaining the discrete iteration mapping model of the Buck-Boost converter according to $$\begin{cases} i_{n+1} = e^{\tau t_m} M_1 \\ u_{n+1} = -Le^{\tau t_m}(M_2 + M_3) \end{cases},$$

wherein $M_1=(I_{n+1}\cos(\omega t_m)+a\sin(\omega T_m))$, $M_2=(\tau I_{n+1}+a\omega)\cos(\omega t_m)$, and $M_3=(a\tau-\omega I_{n+1})\sin(\omega t_m)$; wherein $$a = -\frac{1}{\omega}\left(\frac{u_n e^{2\tau t_{n+1}}}{L} + \tau I_{n+1}\right), \tau = -\frac{1}{2RC},$$

$$\omega = \sqrt{\frac{1}{LC} - \frac{1}{4R^2C^2}}, t_m = T - t_{n+1};$$

and T is a switching cycle of the power switch tube; $i_n$ is an inductor current at a moment nTl $u_n$ is a capacitor voltage at the moment nTl $i_{n+1}$ is an inductor current at a moment (n+1)T; and $u_{n+1}$ is a capacitor voltage at the moment (n+1)T.

5. The method for determining the stability range of the control parameters of the Buck-Boost converter based on the segmented delay feedback control according to claim 4, wherein Buck-Boost converter is operated stably is judged according to whether the inductor current $i_{n+1}$ and the capacitor voltage $u_{n+1}$ at the moment (n+1)T are respectively equal to the inductor current $i_n$ and the capacitor voltage $u_n$ at the moment nT.

6. The method for determining the stability range of the control parameters of the Buck-Boost converter based on the segmented delay feedback control according to claim 2, wherein in step (6), the first function equation is expressed as $$f_{k2max}(k_1)=a_1 e^{b_1 k_1}+c_1 e^{d_1 k_1},$$

in the first function equation, $a_1$, $b_1$, $c_1$ and $d_1$ are coefficients which are positive;

the second function equation is expressed as $$f_{k2min}(k_1)=a_2 e^{b_2 k_1}+c_2 e^{d_2 k_1}$$

in the second function equation, $a_2$, $b_2$, $c_2$ and $d_2$ are coefficients which are positive.

* * * * *